United States Patent [19]

Sakhuja

[11] 4,201,195
[45] May 6, 1980

[54] JET IMPINGEMENT SOLAR COLLECTOR

[75] Inventor: Ravinder K. Sakhuja, Lexington, Mass.

[73] Assignee: Thermo Electron Corporation, Waltham, Mass.

[21] Appl. No.: 954,727

[22] Filed: Oct. 25, 1978

[51] Int. Cl.² ............................. F24J 3/02; F24F 3/04; F24B 1/06
[52] U.S. Cl. .................................... 126/449; 126/444; 126/450; 165/123; 165/124; 165/126
[58] Field of Search ............... 126/432, 441, 444, 445, 126/449, 901; 165/123, 124, 126, 167, 170, DIG. 11

[56] References Cited

U.S. PATENT DOCUMENTS

| 430,762 | 6/1890 | Taylor | 126/417 |
|---|---|---|---|
| 3,804,159 | 4/1974 | Searight et al. | 165/109 |
| 3,939,818 | 2/1976 | Hamilton | 126/432 |
| 3,943,911 | 3/1976 | Yu | 126/432 |
| 3,986,491 | 10/1976 | O'Hanlon | 126/440 |
| 4,007,728 | 2/1977 | Guba | 126/445 |
| 4,016,861 | 4/1977 | Taylor | 126/449 |
| 4,086,908 | 5/1978 | Werner | 126/432 |
| 4,108,242 | 8/1978 | Searight | 165/DIG. 11 |
| 4,130,108 | 12/1978 | Patil | 126/449 |
| 4,134,389 | 1/1979 | McClintock | 126/444 |

OTHER PUBLICATIONS

"Jet Impingement Solar Air Heater," D. R. Rask, 1977, Flat Plate Solar Collector, Conf., 2-1977.

Primary Examiner—James C. Yeung
Assistant Examiner—Daniel J. O'Connor
Attorney, Agent, or Firm—Herbert E. Messenger; James L. Neal

[57] ABSTRACT

A solar collector is described in which air passed through the collector is heated by exchanging heat with a plate which absorbs solar energy. The collector includes a lightweight frame of rectangular cross-section having an inlet and outlet for passage of air, with the top of the frame sealed by a light-transmissive cover such as a sheet of glass. Also included in the collector are an absorber plate mounted in the frame below the cover, and a jet plate spaced a prescribed distance below the absorber plate. One or both of the plates is corrugated, and holes are provided in the jet plate at locations where the gap between plates is a minimum so that during operation of the collector, jets of air are directed through the holes and impinge on the lower surface of the absorber plate to produce efficient heat transfer, while channels defined by the corrugations facilitate flow of the spent jets to the collector outlet with minimal interruption of downstream jets. The disclosed collector provides cost effective solar energy collection since it achieves high air heating efficiencies, is inexpensive to construct, easy to handle and install, long-lived, and is readily adaptable to multi-stage assemblies.

10 Claims, 4 Drawing Figures

JET IMPINGEMENT SOLAR COLLECTOR

BACKGROUND OF THE INVENTION

This invention relates to solar collectors and more particularly to a low cost solar air heater employing jet impingement concepts for high collection efficiency.

Solar air heaters offer the potential of significant energy savings in application where process hot air is required such as the drying of lumber, paper, and food (raisins, prunes, grain) and for winter air heating in areas such as the southwestern region of the United States Unfortunately, present-day solar air heaters or solar collectors exhibit relatively low collection efficiencies, are relatively heavy, and are expensive to construct and install, thus leading to rather high cost of collected solar energy.

In one typical prior art solar air heater, air is heated by causing it to flow in a serpentine path past a flat absorber plate which is mounted beneath one or more glass panes and absorbs solar radiation. The heat transfer coefficient for exchange of heat between absorber plate and air for this configuration is rather low, resulting in less heating of the air than desired and also in a high absorber plate temperature and hence high radiative and convective losses. Use of multiple panes of glass can reduce these losses but lowers transmission of incident radiation and adds to cost. Attachment of fin structures to the absorber plate increases heat transfer to the air but also increases design complexity and cost.

Another source of inefficiency in the conventional design described above is the large total pressure drop resulting from the many bends the air stream must make in passing through the collector, which leads to high costs of the blower/motor used to circulate the air through the collector. Still another drawback is the need for substantial amounts of insulation in the base of the collector to avoid large thermal losses since in the conventional solar air collector the base remains in direct contact with the air as it is progressively heated.

Accordingly, it is an object of the invention to provide a low-cost, efficient solar collector for heating air.

It is another object of the invention to provide a solar collector wherein impingement of air jets on an absorber plate of the collector results in efficient transfer of heat between air and the absorber plate.

It is a further object of the invention to provide a solar collector with jet impingement wherein after impingement the spent jets are discharged from the collector with minimum interference with downstream impinging jets.

SUMMARY OF THE INVENTION

A solar collector for heating air is provided, the collector including a boxlike frame, a light-transmissive cover attached to the frame, an absorber plate mounted below the cover, and a jet plate mounted between the absorber plate and the base of the frame. The absorber plate or the jet plate (or both) is corrugated and the jet plate has a plurality of holes at locations where the gap between plates is a minimum so that air admitted through an inlet in the upstream endwall of the frame is directed through the holes as jets of air which impinge against the lower surface of the absorber plate to produce efficient heat transfer between the air and absorber plate heated by incident solar radiation. Channels defined by the corrugations facilitate flow of the spent jets to an outlet in the downstream endwall with minimal interruption of the impinging jets. In a preferred embodiment of the invention only the absorber plate is corrugated and the distance between circular holes of the jet plate and the absorber plate is in the range of 1–2 times the diameter of the holes. In certain configurations, the jet plate and absorber plate may diverge in the downstream direction to achieve uniform air velocities while accomodating progressively increasing amounts of flow between absorber plate and jet plate. Also, the inlet and outlet of the collector may be shaped to facilitate connection of two or more collectors together into a multi-stage assembly.

DETAILED DESCRIPTION OF THE INVENTION

Figure 1:
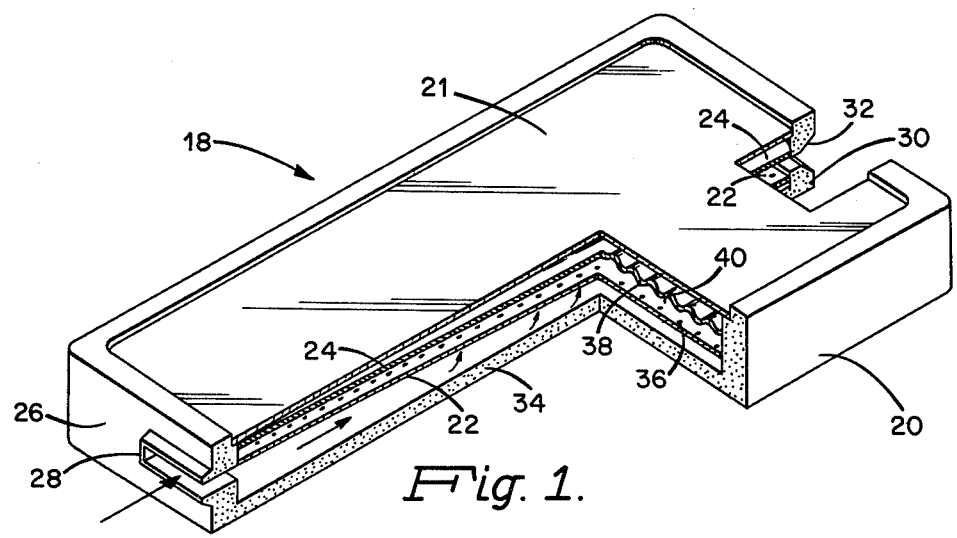
FIG. 1 is a perspective view, with portions partially broken away to expose internal details, of a solar collector according to a preferred embodiment of the invention.

As shown in FIG. 1, in a preferred embodiment the solar collector 18 of the present invention includes a frame 20 in the shape of a box of rectangular cross-section with its top sealed by light-transmissive cover 21 and carrying therein a jet plate 22 and an absorber plate 24. Frame 20 is formed of a rigid insulative material and is preferably a single integral lightweight member molded from foam or plastic and adapted for modular construction into a multistage assembly. If the plastic or other material selected is degradable under prolonged exposure to ultraviolet radiation of the sun, the exterior surfaces of frame 20 should preferably be coated with a paint forming a protective barrier to ultraviolet radiation. A metal frame may be used where weathering requirements are too severe for use of foam or plastic materials.

The upstream endwall 26 of frame 20 has an inlet 28 for the admission of air to be heated within solar collector 18 and the downstream endwall 30 has an outlet 32 for the discharge of heated air, inlet 28 and outlet 32 preferably being of a shape readily permitting series connection of collector 18 to similar collectors (not shown) to form a multi-stage collector assembly.

To permit incident solar radiation to be trapped within collector 18, a light-transmissive cover 21 is mounted near the top of frame 20 essentially parallel to base 34 of frame 20 and forms a seal with frame 20 so that collector 18 is substantially airtight except for the openings provided by inlet 28 and outlet 32. In a preferred form of the invention illustrated in FIG. 1, cover 21 comprises but a single pane of glass or plastic. Use of a single pane rather than two or more panes is possible since the unique jet impingement configuration described in more detail below provides efficient heat transfer within collector 18, resulting in lower absorber plate temperatures than conventional collectors and thus avoiding the need for multiple panes to reduce losses from convection and reradiation through cover 21.

An important feature of the solar collector of the present invention is the arrangement of absorber plate 24 and jet plate 22 mounted in frame 20 between cover 21 and base 34. Absorber plate 24, which is typically metallic, functions to absorb solar radiation transmitted through cover 21 and to exchange heat with air which is first admitted to collector 18 through inlet 28, passes in contact with the lower surface of absorber plate 28, and then discharges as heated air through outlet 32. Absorber plate 24 is preferably coated with flat black paint on both sides for maximum absorption of incident solar radiation as well as radiant heating of incoming air. Selective coatings may also be applied on the top side of absorber plate 24 for higher temperature applications to minimize radiation loss to the atmosphere. In the absence of jet plate 22, a boundary layer of appreciable size would develop along the air-contacting, or lower, surface of absorber plate 24 as a result of airflow along the lower surface, and heat transfer between absorber plate 24 and the air would be inhibited, resulting in high absorber plate temperatures and potentially large radiative and convective losses from absorber plate 24 and generally inefficient collection of solar energy. To interrupt the boundary layer, a rigid jet plate 22 formed, for example, of metal or plastic, is included between absorber plate 24 and base 34 of frame 20 with its upstream end above inlet 28 and its downstream end below outlet 32. Jet plate 22 includes a plurality of jet holes 36 so that air admitted through inlet 28 is directed through holes 36 as jets of air which impinge upon the lower surface of absorber plate 24 and break up or interrupt any boundary layer forming thereon, producing highly efficient heat transfer and heating of air passing through collector 18.

It has been determined experimentally that heat transfer with air is optimum when the distance between jet holes 36 and a target such as absorber plate 24 is 1-2 times the diameter of the jet holes. However, if jet plate 22 is mounted too close to absorber plate 24, cross-flow velocities due to spent jets increase, these cross-flow velocities being generally in a direction normal to that of impinging jets and in the solar collector of the present invention tending to establish airflow in a generally downstream direction towards outlet 32. High cross-flow velocities are undesirable since they bend downstream impinging jets and thus reduce their effectiveness. Also, high cross-flow velocities raise the total pressure drop in the collector to levels where pumping costs to circulate the air are excessive and in addition cause flow maldistributions and hence undesirable theraml stresses in absorber plate 24.

To avoid these detrimental effects of high cross-flow velocities yet maintain the optimum spacing between jet holes 36 and an absorber plate 24, either jet plate 22 or absorber plate 24 (or both) is formed with corrugations such as the corrugations 38 of absorber plate 24 (FIG. 1) which run in a longitudinal direction and define channels 40 extending substantially along the entire length of collector 18 from upstream endwall 26 to downstream endwall 30.

At each location along the length of collector 18 (hereinafter termed axial location) plates 22 and 24 define therebetween a gap whose size varies in the transverse direction due to the corrugations in at least one of the plates, and jet holes 36 in plate 22 are placed such that at each axial location where holes occur the gap or distance between each hole and the opposed surface of absorber plate 24 is a minimum—i.e. the holes are opposite the peaks or ridges of the corrugations. This distance between holes 36 and absorber plate 24 is preferably in the range of 1 to 2 times the hole diameter—e.g. ¼-½ inch for jet holes of ¼ inch diameter. The channels formed between the ridges of the corrugations of either or both plates adjacent to the area of jet impingement provide a relatively large flow area for accommodating cross flows at relatively low velocities and hence with minimum interference to the impinging jets of air.

Figure 2:
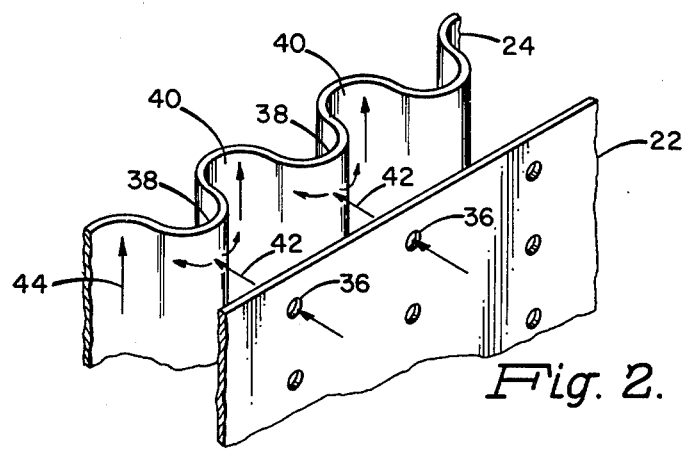
FIG. 2 is an enlarged view in perspective of a portion of the solar collector of FIG. 1 showing details of the jet plate and absorber plate and the pattern of air flow with respect to these plates.

In the embodiment of the invention shown in FIG. 1 and a portion thereof in FIG. 2, absorber plate 24 has a corrugated surface while jet plate 22 is substantially flat and mounted parallel to absorber plate 24. Use of an absorber plate with a corrugated surface is desirable since, in addition to permitting optimization of the spacing between jet holes 36 and absorber plate 24 and control of cross-flow velocities, the corrugated surface of absorber plate 24 presents an area to incident radiation substantially larger than would a flat plate and also absorbs a relatively larger fraction of incident radiation than would a flat plate.

The pattern of airflow with respect to jet plate 22 and absorber plate 24 is illustrated in FIG. 2, where arrows 42 indicate jet impingement flow and arrows 44 show crossflow of the spent jets.

Figure 3:
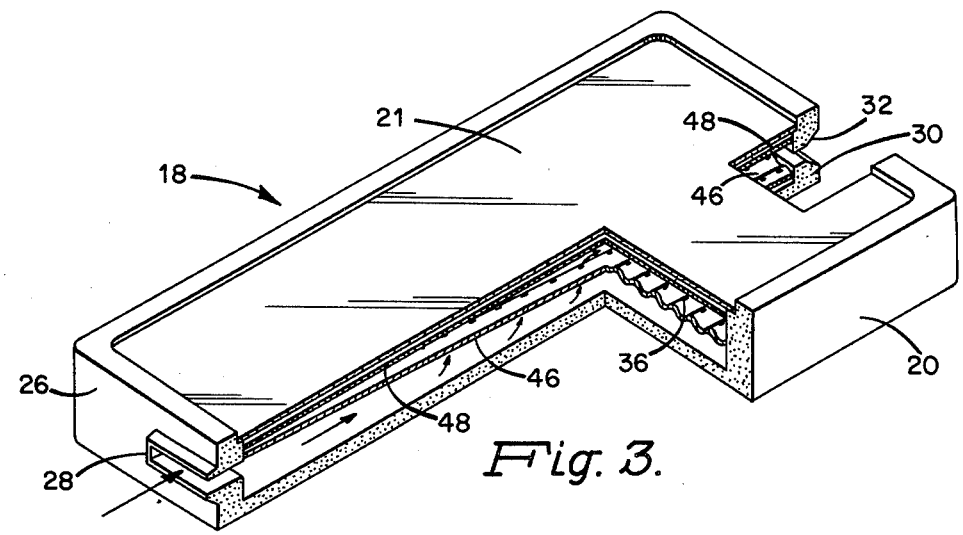
FIGS. 3 and 4 are perspective views, partially broken away, of solar collectors according to alternate embodiments of the invention.

An alternate embodiment of the solar collector is shown in FIG. 3 wherein jet plate 46 is corrugated and absorber plate 48 is flat. Another optional feature of the invention illustrated in FIG. 3 is the orientation of jet plate 46 and absorber plate 48 which are non-parallel and diverge in the downstream direction to provide a gradual increase in flow area in the space between jet plate 46 and absorber plate 48 in the downstream direction to accommodate the increasing amount of air entering this space through successive jet holes.

Figure 4:
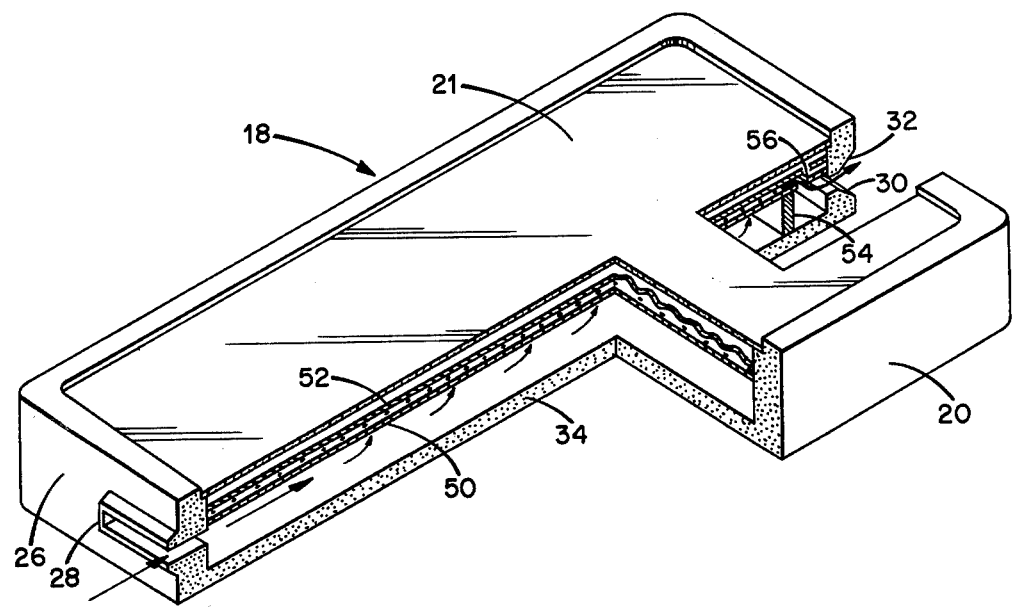

In another alternate embodiment illustrated in FIG. 4 jet plate 50 and absorber plate 52 are parallel to cover plate 21 and are positioned above inlet 28 and outlet 32. A blocking member 54 disposed between base 34 and jet plate 50 near the downstream end of collector 18 and extending transversely across the collector blocks axial flow of air and ensures that all air entering inlet 28 passes through jet holes 36 and between jet plate 50 and corrugated absorber plate 52 prior to flowing through outlet 32. One or more elongated holes in jet plate 50 in the portion thereof between blocking member 54 and downstream endwall 30 such as hole 56 permits the outflow of heated air from between plates 50 and 52 through outlet 32 of collector 18.

During operation, (see FIGS. 1 and 2) air to be heated is admitted into collector 18 through inlet 28, a blower or similar device (not shown) typically being used to circulate the air and overcome losses associated with flow through collector 18 or through a multi-stage assembly of similar collectors. As the air admitted through inlet 28 travels downstream, portions of it are directed upward through holes 36 in jet plate 22 to impinge as jets of air against the lower surface of absorber plate 24, which has been heated by solar radiation transmitted through cover 21. The jets act to interrupt the formation of a thick boundary layer on absorber plate 24 and thus to enhance heat transfer between plate 24 and the air. The spent jets form a cross-flow of air which travels in the downstream direction primarily in the channels defined by the corrugations in absorber plate 24. This cross-flow of heated air is subsequently discharged through outlet 32 for use as heated process air or to be heated further, for example in a collector whose inlet engages outlet 32 of collector 18.

In connection with operation of solar collector 18, it should be noted that since heating of the air occurs above jet plate 22, little or no insulation to prevent thermal losses is needed at the base 34 or on those portions of the sides of frame 20 below plate 22 if ambient air is being heated within a single-stage collector. Even in multi-stage collectors, less insulation is needed for a given level of allowable thermal loss from the base than for conventional solar air collectors since the average air temperature near the base is lower for collectors employing the jet plate and absorber plate of the present invention.

It will be appreciated that because of its simple, lightweight construction the above-described solar collector is inexpensive to fabricate in addition to providing the highly efficient heating of air mentioned earlier.

While there have been shown and described what are considered preferred embodiments of the invention, it is understood that various other modifications may be made therein, and it is intended by the appended claims to cover all modifications which fall within the true spirit and scope of the present invention.

What is claimed is:

1. A solar collector for heating air comprising:
   a boxlike frame including a base and integral therewith an upstream endwall having an inlet for admitting air to be heated, a downstream endwall substantially parallel to said upstream endwall and having an outlet for discharging heated air, and two sidewalls attached to said endwalls;
   a light-transmissive cover attached to said frame in spaced relation to said base;
   an absorber plate mounted in said frame between said cover and said base and adapted to absorb solar radiation transmitted through the cover; and
   a jet plate mounted in said frame between said absorber plate and the base and having a plurality of holes therethrough, the upstream end of said jet plate being positioned above said inlet and the downstream end of said jet plate being positioned below said outlet such that during operation of the solar collector air admitted through said inlet under pressure passes through the jet plate holes and is directed as jets of air against said absorber plate to exchange heat therewith, and the heated air is then discharged through the outlet in said downstream endwall;
   at least one of said plates having corrugations therein defining a plurality of channels extending along said frame in an axial direction substantially parallel to said sidewalls and also defining at each axial location a gap of varying size between said plates, and wherein the holes in said jet plate at a specified axial location occur where the gap between plates is a minimum.

2. The solar collector of claim 1 wherein said jet plate is substantially flat and said absorber plate is corrugated.

3. The solar collector of claim 1 wherein the holes of said jet plate are circular and the distance between the holes of said jet plate and the absorber plate is in the range of 1-2 times the diameter of the holes.

4. The solar collector of claim 2 wherein said frame is constructed of a unitary molded plastic material and wherein at least certain portions thereof are coated with a paint forming a protective barrier to ultraviolet radiation.

5. The solar collector of claim 1 wherein said jet plate and said absorber plate diverge in the downstream direction to provide more uniform velocities within the collector.

6. The solar collector of claim 1 wherein said inlet and outlet of said frame are shaped to facilitate connection of said collector to similar collectors to form a multistage collector assembly.

7. A solar collector for heating air comprising:
   a rigid plastic frame of generally rectangular cross-section, said frame having an upstream endwall with an inlet for admitting air to be heated into the collector and a downstream endwall with an outlet for discharging heated air from the collector;
   a glass cover sealably mounted in the top of said frame substantially parallel to the base thereof and adapted to transmit solar radiation into the collector;
   a metallic absorber plate adapted to absorb solar radiation transmitted through the cover, said plate spaced between said glass cover and said base and having corrugations forming channels extending from the upstream endwall to the downstream endwall; and
   a jet plate mounted between said absorber plate and said base parallel to said absorber plate and having a plurality of circular holes therethrough for directing jets of air upward to impinge against the absorber plate for efficient heating of air passing through the collector, the holes in said jet plate being present at locations of minimum gap between said jet plate and the corrugations of said absorber plate whereby the channels adjacent to the point of impingement of an air jet permit downstream passage of air subsequent to jet impingement with minimal interference to said jets.

8. A solar collector for heating air comprising: a boxlike frame including a base and integral therewith an upstream endwall having an inlet for admitting air to be heated, a downstream endwall substantially parallel to said upstream endwall and having an outlet for discharging heated air, and two sidewalls attached to said endwalls;
   a light-transmissive cover attached to said frame in spaced relation to said base;
   an absorber plate mounted in said frame between said cover and said base and adapted to absorb solar radiation transmitted through the cover;
   a jet plate mounted in said frame between said absorber plate and the base above said inlet and said outlet, said jet plate having a plurality of jet holes therethrough distributed over a substantial portion of the plate and one or more elongated holes therethrough near its downstream end; and
   a blocking member disposed between said base and said jet plate near said downstream endwall but upstream of said one or more elongated holes such that during operation of the solar collector air admitted through said inlet under pressure passes through the jet holes and is directed as jets of air against said absorber plate to exchange heat therewith, and the heated air is then discharged through said one or more elongated holes and then through the outlet in said downstream endwall;
   at least one of said plates having corrugations therein defining a plurality of channels extending along said frame in an axial direction substantially parallel to said sidewalls and also defining at each axial location a gap of varying size between said plates, and wherein the jet holes in said jet plate at a specified axial location occur where the gap between plates is a minimum.

9. The solar collector of claim 8 wherein said jet plate is substantially flat and said absorber plate is corrugated and is coated with flat black paint on both sides thereof.

10. The solar collector of claim 8 wherein said jet plate is substantially flat and said absorber plate is corrugated and is coated with flat black paint on the bottom side thereof and a selective coating on the top side thereof.

* * * * *